June 8, 1965   P. C. NETZEL   3,188,415
SWITCHGEAR DISCONNECT MECHANISM
Filed Dec. 11, 1962   3 Sheets-Sheet 1

INVENTOR:
PHILIP C. NETZEL,
BY Albert S. Richardson Jr.
ATTORNEY.

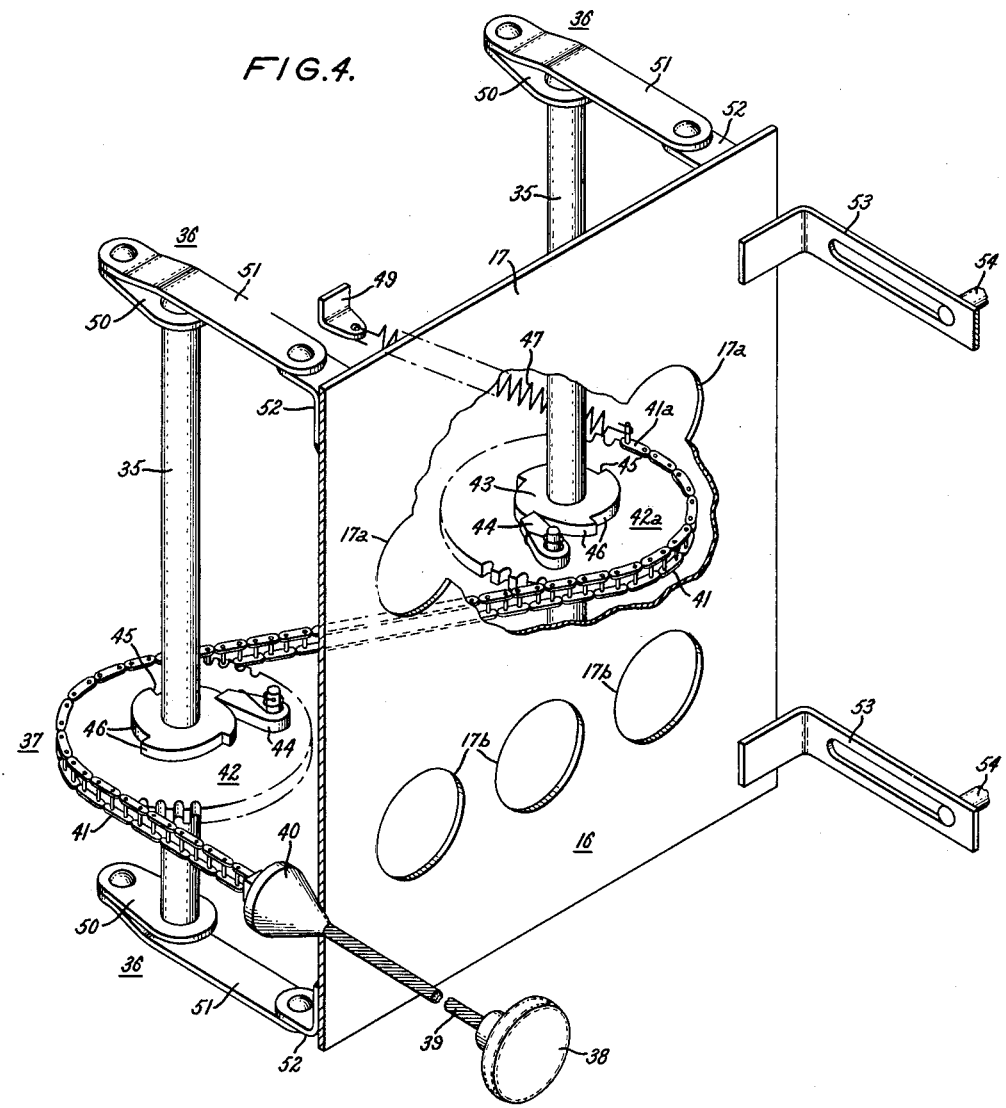

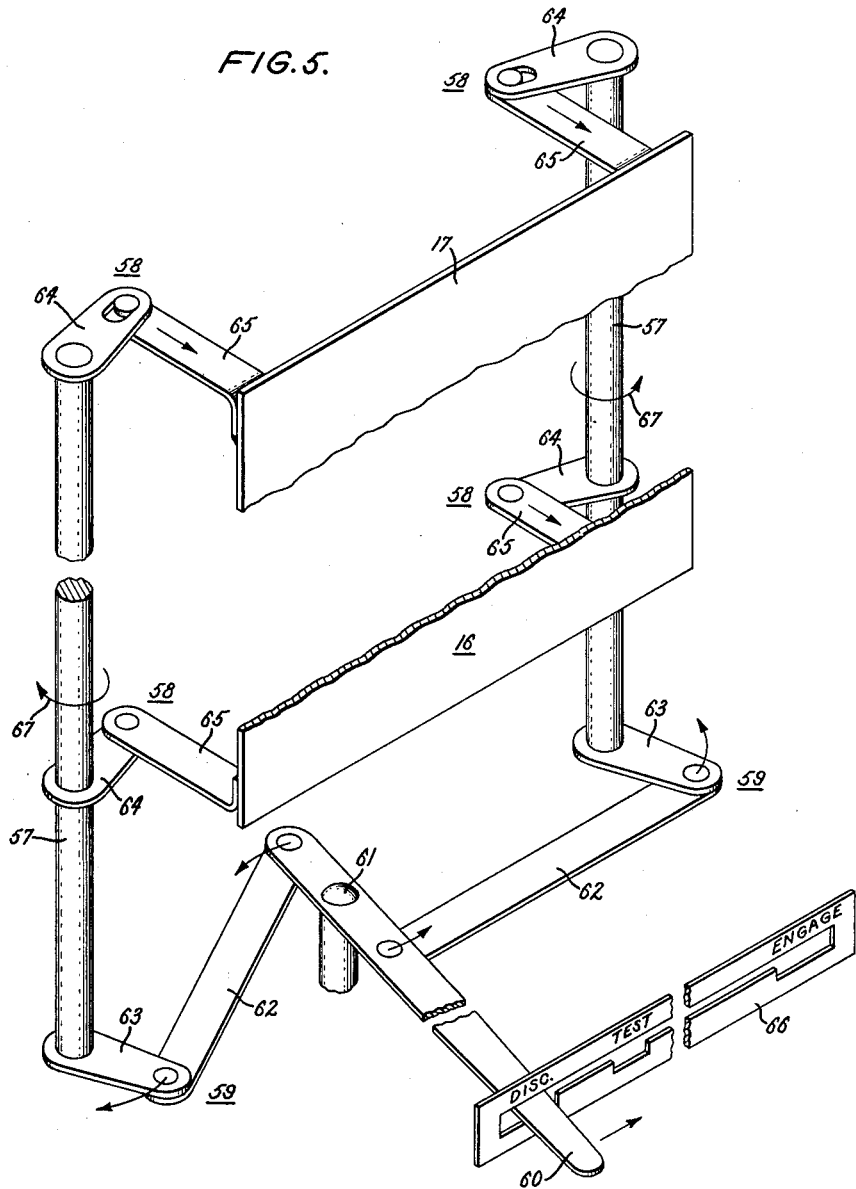

United States Patent Office 3,188,415
Patented June 8, 1965

3,188,415
SWITCHGEAR DISCONNECT MECHANISM
Philip C. Netzel, Milmont Park, Pa., assignor to General Electric Company, a corporation of New York
Filed Dec. 11, 1962, Ser. No. 243,922
12 Claims. (Cl. 200—50)

This invention relates to electrical switchgear apparatus and, more particularly, to a disconnect mechanism for a removable electric circuit breaker which allows complete de-energization of the circuit breaker without physical movement thereof.

In the electric power switchgear art, it is customary practice to house removable circuit breakers within individual, grounded sheet metal enclosures. Through the use of cooperating, separable "disconnect" members, the circuit breakers are connected to or disconnected from associated supply and load circuits by either moving the circuit breaker or by retracting the supply and load circuit disconnect members from interengagement with the breaker's disconnect members. After disconnection has been completed, the breaker may be stored in its enclosure, or it may be removed bodily therefrom for purposes of repair or maintenance.

It is not always desirable to have to move the breaker in order to disconnect it from the supply and load circuits. One prior art arrangement in which the circuit breaker is moved horizontally for this purpose requires the provision of an enlarged enclosure having extra depth to allow movement of the breaker unit to a fully disconnected position for storage within the enclosure. Such an arrangement may also require special elongated operating means to permit manual operation of the breaker from outside the enclosure when it is recessed deeply therein in its connected position.

Other known arrangements include extensible hinges for a compartment door permitting the door to swing into a plane spaced from but parallel to the front of the enclosure when the breaker is moved to its disconnect position; "reversible" access panels having a concave cross section requiring reversal of the panel depending upon whether the breaker is connected to or disconnected from the circuit; and telescoping side panels permitting extension of the enclosure when the breaker is being disconnected. All of these involve relatively complex mechanisms and intricate operation. Moreover, substantial force is required to move the weight of the breaker in addition to overcoming frictional resistance to the necessarily tight engagement between the separable disconnect members. The present invention relieves the above mentioned objections by enabling the breaker to be disconnected from the supply and load circuits while remaining stationary.

Accordingly, a general object of this invention is to provide improved means for connecting and disconnecting a circuit breaker with respect to supply and load circuits without moving the circuit breaker.

Another object is to provide relatively rapid horizontal movement of the disconnecting means.

Another object is to provide improved disconnect means having a manual operating handle which is conveniently accessible from in front of the circuit breaker.

A further object of this invention is the provision of improved disconnecting means having flexible actuating means which is inexpensive to manufacture, compact in structure and convenient to operate.

A still further object of the invention is to provide an improved manually operable mechanism for moving the disconnecting means, characterized by a large mechanical advantage.

In accordance with one embodiment of my invention, means are provided for disconnecting an electrical switchgear apparatus, such as a circuit breaker, from a supply source and/or load without moving the circuit breaker. This is achieved by providing an intermediate member between the apparatus and the supply and/or load which member is movable between two extreme positions, a disconnect position and an engaged position. Between these two extremes is an interim position in which only part of the apparatus is energized for test purposes.

Movement is imparted to the intermediate member by a mechanism which includes means for communicating rectilinear motion of an operating handle to a drive shaft or shafts having output cranks connected to the intermediate member. The handle for actuating the mechanism is located so as to be conveniently accessible for manual operation from in front of the circuit breaker and its housing and, in combination with the mechanism, is designed to have a large mechanical advantage to facilitate easy and rapid operation.

Further objects and advantages of this invention will become apparent and the invention will be better understood from the following description referring to the accompanying drawings, and the features of novelty which characterize this invention will be pointed out with particularity in the claims annexed to and forming a part of this specification.

In the drawings,

FIGURE 4 is an enlarged perspective view showing the preferred embodiment of the operating means for actuating the disconnect mechanism.

FIGURE 5 is an enlarged perspective view showing an alternative embodiment of the operating means for actuating the disconnect mechanism.

Figure 1:
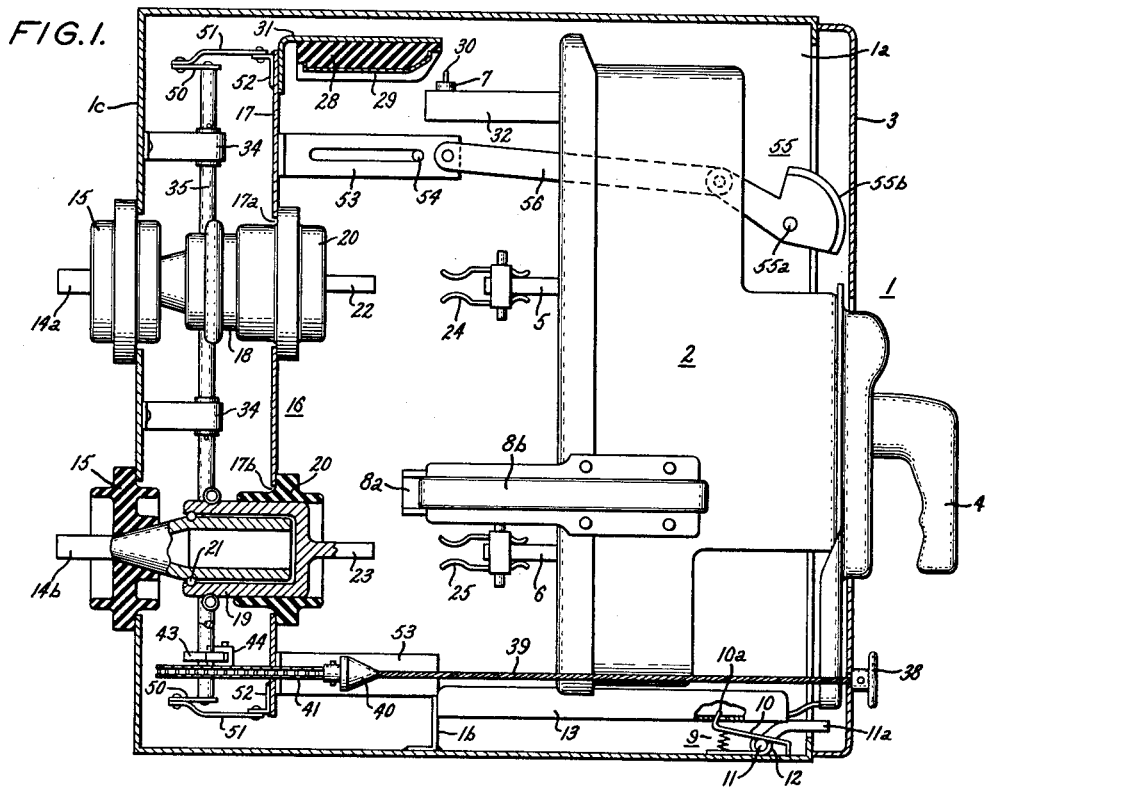
FIGURE 1 is a cross-sectional side elevational view of a circuit breaker enclosure and disconnecting mechanism embodying the invention and illustrating the disconnect mechanism in a disengaged position.
Figure 2:
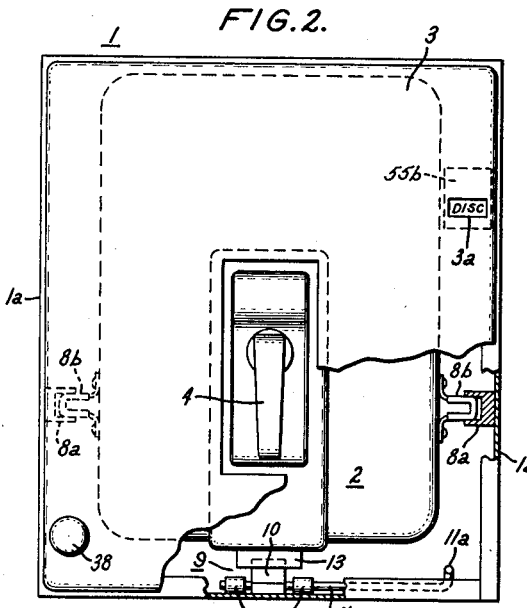
FIGURE 2 is a front elevational view with part of the front panel being broken away.

Referring now to FIGURES 1 and 2, there is shown a stationary sheet metal housing or enclosure unit 1 for electrical switchgear apparatus such as a removable circuit breaker 2. The circuit breaker is received inside the enclosure between its opposing sidewalls 1a and behind an openable front cover or door panel 3 which is suitably hinged to the left-hand sidewall. The circuit breaker's manual operating handle 4 protrudes frontwardly through an opening in the panel 3 whereby the enclosed breaker can be operated externally. The circuit breaker 2 is equipped with several pairs of primary disconnect members 5 and 6 which extend from its rear and serve to incorporate the respective poles of the circuit breaker within a polyphase electric power circuit, as will soon be explained in greater detail. The breaker poles are disposed in side-by-side relation to each other, and therefore only one pair of the disconnect members 5 and 6 can be seen in the side elevational view of FIGURE 1. The circuit breaker 2 also has extending rearwardly therefrom a secondary disconnect member 7 which serves to incorporate the electrical control and auxiliary devices of the breaker within a control circuit (not shown).

The circuit breaker 2, being removable from the enclosure 1 for repair or replacement purposes, is suitably supported to facilitate this event. As it is illustrated in FIGURES 1 and 2, the supporting means comprises a pair of horizontally disposed channels 8a affixed to the inboard sides of the respective sidewalls 1a and adapted to receive cooperating runners 8b carried on the breaker sides. Thus the breaker 2, upon opening the front panel 3, is slidable in a horizontal direction into and completely out of the enclosure 1.

The enclosure 1 is provided with means 9 for releasably holding the circuit breaker 2 in a fixed "operating" disposition therein. The holding means as illustrated in FIGURES 1 and 2 comprises a spring biased latch member 10 welded tangentially to a shaft 11 which is journaled in brackets 12 at the bottom of the enclosure. An upstanding end 10a of the latch member is urged by its bias into a cooperating recess of a channel-like undercarriage 13 of the circuit breaker when in its operating disposition, and the breaker is then immovable relative to the enclosure. Coincidentally the rear end of the undercarriage 13 is abutting an angle 1b of the enclosure 1 to physically block any further insertion of the breaker in its housing. Thus the breaker 2 is releasably anchored or captured in a predetermined fixed position inside the enclosure 1, in which position it is spaced as shown from the end wall 1c which spans the enclosure sidewalls 1a. The shaft 11 to which the holding latch member 10 is fastened has a bent-over part 11a as shown, and upon manually raising this part (having first opened the panel 3 for access thereto), the latch is tilted so as to remove its end 10a from the recess in undercarriage 13, thereby releasing the circuit breaker 2 for withdrawal from its fixed disposition within the enclosure. For purposes of the present description, hereinafter the breaker 2 is considered to remain fixedly disposed in the relatively stationary operating position in which it has been shown in FIGURE 1.

Fixed line terminals or studs 14a and 14b are provided for electrically connecting the circuit breaker 2 to external supply and load lines of the polyphase power circuit (not shown). These studs pass through insulating supports 15 which serve as joinder members to allow the studs 14a and 14b to be fastened to the rear or end wall 1c of the enclosure 1.

In order electrically to engage the circuit breaker 2 to the supply and load circuits through line terminals 14a and 14b without requiring movement of the breaker, I provide a reciprocating intermediate or disconnecting member 16. This intermediate member 16 is movably supported inside the enclosure 1 in front of the rear wall 1c, in the space between the line terminals 14a, 14b and the position of the primary disconnect members 5, 6 of the circuit breaker 2 when the breaker is in its fixed disposition as shown. The intermediate member is formed of a metal frame 17 having several pairs of apertures 17a and 17b through which extend primary disconnect members 18 and 19, respectively. Insulating supports 20 join these disconnect members to the frame for joint movement therewith. The primary disconnect members 18 and 19 serve as the direct electrical connection between each pair of primary disconnect members 5 and 6 of the circuit breaker and the corresponding pair of nearby line terminals 14a and 14b which form part of the supply and load circuits, respectively.

In order to permit the primary disconnect members 18 and 19 to reciprocate horizontally and yet maintain continuous electrical contact with the respective line terminals 14a and 14b as the member 16 is being moved relative to the enclosure rearwall 1c, these primary disconnect members are hollow at one end for telescoping engagement with the line terminals. A plurality of slidable or rotatable electrical conductors 21 are provided between primary disconnects 18 and 19 and the line terminals 14a and 14b so as to maintain good electrical contact between these interengaged parts throughout the course of reciprocating movement of the disconnect members within stationary enclosure 1. The forward ends of the primary disconnect members 18 and 19 are formed as blades 22 and 23 so as to serve as the male mating member when fractionally engaged with resilient spring-loaded contact fingers 24 and 25 which are attached to the ends of the circuit breaker's primary disconnect members 5 and 6, respectively. Obviously the breaker's primary disconnect members 5 and 6 are properly aligned with the primary disconnect members 18 and 19 so that horizontal movement of the latter with respect to the former will bring the two into direct contact.

The movable intermediate member 16 reciprocates horizontally between two extreme predetermined positions, a disconnect position and an engaged position and, in so doing, traverses a third predetermined position called an intermediate or interim position. In the engaged position the circuit breaker 2 is electrically connected to the supply and load circuits through the primary disconnect members 18 and 19 which are in electrical contact with both the circuit breaker's primary contacts 5 and 6 and the supply and load line terminals 14a and 14b. In the disconnect position, the intermediate member 16 is in its extreme rearward location, thus causing the primary disconnect members 18 and 19 to be out of contact with or separated from the circuit breaker's primary disconnect members 5 and 6. The circuit breaker is thereby electrically isolated from the supply and load circuits.

Figure 3:
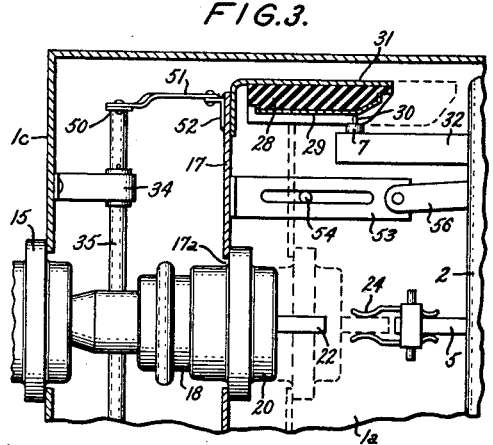
FIGURE 3 is a side elevational view of a portion of the disconnect mechanism of FIGURE 1 illustrating the interim position (solid lines) and the engaged position (dash lines) thereof.

The disconnect position is illustrated in FIGURE 1 while the interim and engaged positions are illustrated in FIGURE 3, the interim position being shown by solid lines and the engaged position being shown by dash lines.

Circuit breakers of the kind contemplated herein are often equipped with suitable mechanisms and control devices for electrical operation thereof. These include such devices as motors, solenoids, or similar means for the purpose of opening and closing the circuit interrupting contacts in response to the operation of suitable control switches and relays located locally or remotely therefrom. In order to connect such devices on the removable breaker 2 to a suitable external electric control circuit (not shown), the enclosure 1 includes a secondary disconnect member 28 having a plurality of contacts adapted to engage corresponding contacts of the disconnect member 7 which is part of the circuit breaker equipment. The contacts of the secondary disconnect member 28 are formed by a plurality of parallel conductive strips 29, only one of which can be seen in the drawings. The secondary disconnect member 7 comprises a plurality of spring-loaded contact fingers (one being shown at 30) which are wired to the various electrical devices with which the breaker 2 is equipped. The finger 30 and strip 29 of the members 7 and 28 are disposed for slidably interengagement as is shown in FIGURE 3.

It is desirable to provide means for testing circuit breaker operation without energizing the load circuit each time the interrupting contacts of the circuit breaker being tested are closed. Toward this end I have mounted the secondary disconnect member 28 on the intermediate member 16 for joint movement therewith. As can be seen in FIGURES 1 and 3, projecting frontwardly at the upper end of the metal frame 17 is a bracket 31 from which the secondary disconnect member 28 depends. The cooperating member 7 faces upwardly on an arm 32 extending from the rear of the circuit breaker 2 at an elevation slightly lower than the disconnect member 28. With this arrangement it is necessary to connect the contacts 29 of member 28 to the external control circuit by coiled wires or other suitable means (not shown) which will accommodate the limited reciprocating travel which disconnect member 28 undergoes with the intermediate member 16 of my invention.

It should be noted that in the interim position of the intermediate member 16 only the secondary disconnect members 7 and 28 are interengaged, while the circuit breaker's primary disconnect members 5 and 6 are not engaged by the primary disconnect members 18 and 19. On the other hand, in its forward, engaged position (dash lines, FIGURE 3) both the secondary and primary disconnect members interengage their respective complementary elements to form complete circuits therewith. This arrangement provides a test position (the interim position) in which the breaker's electrical operation can be tested without energizing the load circuit each time the interrupting contacts of the circuit breaker being tested are closed, and it also provides a position (the engaged position) in which the electrical control and auxiliary devices of the breaker, such as, for example, closing motor, shunt trip coil and position indicating switch, are connected to the external control circuit with the circuit breaker concurrently included within the main supply-load circuit. Alternatively, upon moving the intermediate member 16 to its disconnect position (FIGURE 1) both secondary and primary disconnects are separated, and the circuit breaker 2 is now fully deenergized in which condition it can safely be stored. And it will be observed that all the while the breaker 2 has remained stationary in its predetermined fixed position within the enclosure 1.

Now that the intermediate or disconnecting member 16, its purpose and operation, have been explained in detail, the means for rapidly and positively moving this member between the three predetermined positions discussed above will be described. The operating mechanism forming the first and preferred embodiment of my invention, as is best seen in FIGURE 4, includes a pair of rotatable drive shafts 35 which are connected to the member 16 through a linkage system 36 and which are driven by a chain and sprocket wheel assembly 37. The drive shafts 35 are vertically disposed adjacent to the enclosure rear wall 1c to which they are journaled at 34 (FIGURES 1 and 3).

Proceeding in the order in which the operating mechanism is actuated, the mechanism comprises a manual operating knob 38 which is appropriately seated at the front of door panel 3 where it is conveniently accessible to an operator. Connected at one end to the knob 38 is a flexible cable 39 with a stop member 40 located on the opposite end thereof, the purpose of which will be explained hereinafter. One of the advantages of using a flexible shaft or cable 39 is that it can be easily located in any available clearance space relatively near the area of use in spite of the fact that the direct line between the point of connection to the sprocket wheel and the operating handle is not completely clear. That is, the cable can be curved toward the stationary enclosure walls and held in place by holders (not shown) which may be placed immediately behind the operating knob. This provides a greater flexibility in designing the interior of the housing and the location of the apparatus therewithin. Another advantage in using a flexible cable is that the operating knob can be located in any desired location, either on the front wall or door panel as disclosed above or on any of the side walls, simply by employing any suitable mechanical means such as a pulley for changing the direction of rectilinear motion of the cable.

Coupled to the flexible cable 39, through the stop member 40, is a flexible driving means, such as a roller chain 41, which positively engages an angularly movable member, such as sprocket wheels 42 and 42a, mounted on each of the shafts 35. The sprocket wheels are appropriately mounted so as to provide relative rotational motion between the sprocket wheels and their respective shafts, and hence these members can oscillate on the drive shafts. A rotatable member or ratchet wheel 43 is fixedly keyed to each shaft 35 immediately adjacent the sprocket wheel 42 or 42a. Pivotally mounted upon the face of each sprocket wheel, and spring biased into engagement with the ratchet wheel, is a clutching means, such as a pawl 44, which positively engages pawl-receiving teeth 45 of which there are four, on the corresponding ratchet wheel 43. When the sprocket wheels are angularly advanced in one direction, the pawls drivingly engage their corresponding ratchet wheels and rotate them along with the shafts. When the sprocket wheels rotate in the opposite direction, each pawl rides over the surfaces 46 of its ratchet wheel and resets behind another tooth 45, leaving the wheel and shaft stationary. The roller chain 41 is S-shaped in configuration with respect to the sprocket wheels 42 and 42a traveling behind wheel 42 and around the front of wheel 42a to its end 41a, whereby a long arc of contact between the roller chain 41 and the sprocket wheels is provided, resulting in a more positive drive. This arrangement will cause counterrotational motion between the two sprocket wheels 42 and 42a and between the shafts 35. A resilient member or spring 47 connected to the chain end 41a, as is shown in FIGURE 4 biases the chain and hence the associated sprocket wheels in a direction to resist motion caused by pulling the knob 38 and, as a result, effects the return of the driving train to its starting position upon release of the knob. The spring 47 is attached at one end to the roller chain and is attached at its opposite end to a bracket 49 mounted on a stationary member such as an enclosure wall (not shown).

In order to transmit and convert the rotary motion of the drive shafts to reciprocating motion of the intermediate member 16, a linkage system 36 is provided at each end of the shafts 35 linking them to the member 16. Each such system comprises an output crank 50 keyed to the corresponding shaft 35 and a link 51 which is pivotally attached at one end to crank 50 and pivotally attached at the other end to the frame 17 of intermediate member 16 through a bracket 52 secured thereto. A pair of slotted guide members 53 are attached to the frame 17 and cooperate with pins 54 mounted on a stationary side wall 1a of the enclosure (FIGURE 1) to guide and partially support the intermediate member for to and fro rectilinear movement. Rotation of the shafts 35, produced as indicated above, causes angular advancement of the cranks 50 which, through the action of the links 51 and the converting effect of the guide members, translates the intermediate member 16 rectilinearly.

In actuating the member 16, knob 38 is withdrawn from its seated position adjacent the door panel 3 as far as the stop member 40 will permit. This operation causes the roller chain 41 to be pulled forwardly and, in turn, rotates the sprocket wheels 42 and 42a a predetermined number of degrees which is determined by the location of the stop member on the cable 39. Since the sprocket wheels 42 and 42a are rotated in such a direction as to cause the pawls 44 to abut against the peripheral teeth 45 of the ratchet wheels 43, the ratchet wheels and the shafts 35 to which the ratchet wheels are fixedly attached are advanced an equal number of degrees. As explained above, the combined action of the shafts and the linkage systems 36 translates the intermediate member 16 a distance calculated to place it in one of the predetermined positions. Upon release of the knob 38 the biasing spring 47 returns the sprocket wheels 42 and 42a, the roller chain 41, the cable 39, and the knob 38 to their original positions. During the return movement, each pawl 44 rides over the ratchet surface 46 until it falls into engagement with the next tooth which will occur at a point coincident to the return of the system to its starting position. The system is then ready for the next actuation. Four such operations will result in one complete rotation of the ratchet wheels and shafts and one complete cycle of the intermediate member, i.e., from the disconnect position to the test, engagement, test and finally back to the disconnect position. Preferably, the angular disposition of the ratchet teeth 45 and their radial distances from the axis of the associated drive shaft are appropriately varied so that this mechanism operates with greater mechanical advantage while moving the member 16 between test and engaged positions than while moving it between test and disconnect.

In order to provide a visual indication of the position of the disconnecting member 16 from in front of the enclosure 1, suitable indicating means such as that shown schematically at 55 in FIGURE 1 is provided. This means comprises an indicator 55 pivotally attached at 55a to the enclosure sidewall 1a and having an arcuate face 55b disposed immediately behind the door panel 3. Its face 55b has appropriate legends, seen through a small window 3a in the panel 3 (FIGURE 2), to identify the respective positions of member 16 according to the angular position of the indicator. The angular position of 55 is changed upon movement of the frame 17 to which it is connected by an elongated link 56 and the guide member 53 as shown.

While the above operating mechanism was described in terms of a dual system involving two rotatable portions, it should be obvious to one skilled in the art that the operation could be achieved with a greater or lesser number of rotatable portions. Additionally, while a linkage system 36 was described as being located at both ends of the rotatable shafts, it alternatively might be located at only one end of the shaft and this linkage system might be replaced by a mechanical equivalent such as a rack and pinion, designed to convert rotary motion to rectilinear motion.

The operating mechanism forming the second embodiment of my invention, which is illustrated in FIGURE 5, includes a pair of oscillatable drive shafts 57, each shaft being connected to the intermediate or disconnecting member 16 through a driven linkage system 58 and actuated by a driving linkage system 59. As with the preceding discussion, the operating mechanism illustrated in FIGURE 5 will be described in order of its operation, starting with the operating member or lever 60 which protrudes exteriorly through the front wall or door panel of the enclosure 1. The operating lever 60 is rotatably supported within the enclosure at a point near its rear end, as shown at 61, and has pivotally attached to it on each side of the support point a first driving link 62 which is, in turn, pivotally connected to an eccentric end of a second driving link 63. The second link is keyed to one end of the shaft 57 and actuates the shaft when the operating lever is moved.

Two pairs of driven links 64 and 65, which form the driven linkage systems 58 connecting the shaft 57 to the disconnecting switch member 16, are fixedly attached to each drive shaft 57 in a position vertically displaced from the driving linkage system 59. The first driven link 64 comprises an output crank of the shaft, and it is pivotally joined through a slotted connection to one end of the driven link 65 which, at its other end, is fixedly connected to the metal frame 17 of member 16.

In order to translocate the intermediate member 16 from one position to another, such as from the disconnect position to the interim or test position, the operating lever 60 is pivoted about its axis of rotation by moving it from the "disconnect" position to the "test" position as indicated on an indicator plate 66 mounted adjacent thereto. The movement is transferred to the shafts 57 through the driving linkage systems 59 and the shafts are rotated in a given direction a predetermined number of degrees determined by the extent of the movement of the operating lever 60. This rotation of the drive shafts is transmitted through the output cranks 64 to the driven links 65 which are thereby translated forwardly the proper distance to place the intermediate member 16 into the desired position. Further movement of the operating lever in the same direction causes additional rotation of the shafts and moves the member 16 further forward to its "engage" position. It should be noted that due to the location of the first driving links 62 on opposite sides of the operating lever's support point 61, the shafts 57 rotate counter to one another as indicated by the arrows 67. Reversal of the direction of movement of the operating lever 60 reverses the operation of the linkages and, consequently, retracts the intermediate member 16 into its test and hence to its disconnect position.

While the second embodiment is discussed with respect to a dual operating mechanism comprising a pair of oscillatable shafts, it should be obvious to one skilled in the art that a single shaft or a greater number of shafts may be employed if desired.

While the preferred forms of the invention have been shown and described specifically, it will be apparent to those skilled in mechanical art that numerous changes and substitutions of mechanical equivalents might be made. This can be illustrated by the examples mentioned above wherein a different number of shafts may be utilized along with various transmission systems so long as the rectilinear reciprocating motion of the intermediate member 16 between predetermined positions is achieved. Such motion in the horizontal direction could alternatively be achieved by means of a jackscrew journaled to the stationary enclosure with its driven end accessible for turning by a crank from in front of the enclosure. I therefore contemplate by the claims which conclude the specification to cover all such modifications as fall within the true spirit and scope of this invention.

What I claim as new and desire to secure by Letters Patent of the United States is:

1. In electric switchgear apparatus, an enclosure unit for a removable circuit breaker equipped with a first pair of primary disconnect members and a first secondary disconnect member, the enclosure unit comprising:
    (a) a pair of opposing side walls;
    (b) an end wall spanning said side walls and having stationary line terminals mounted thereon;
    (c) means adapted to support the circuit breaker in between said side walls in spaced relation to said end wall;
    (d) a moveable intermediate member supported within the unit adjacent to said end wall for reciprocating movement toward and away from the end wall, said intermediate member having mounted thereon a second pair of primary disconnect members and another secondary disconnect member and said second pair of members being disposed in continuous electric contact with said line terminals throughout the course of reciprocating movement of the intermediate member; and
    (e) means for moving said intermediate member from a first position wherein both said second pair of primary disconnect members and said other secondary disconnect member are adapted to engage corresponding disconnect members of the circuit breaker, through a second position wherein only the secondary disconnect members are adapted to interengage one another, and to a third position in which neither said second pair of primary disconnect members nor said other secondary disconnect member is able to engage the corresponding disconnect members of the circuit breaker.

2. An electric switchgear apparatus as defined in claim 1 wherein the reciprocating movement of said intermediate member takes place in a horizontal direction and said means for moving the intermediate member includes a manually operative actuating member accessible from outside the enclosure unit.

3. In an electric switchgear apparatus:
    (a) means defining an enclosure, including spaced side walls and an end well disposed therebetween;

(b) stationary line terminals supported adjacent to said end wall;

(c) a circuit breaker positioned within said enclosure, said circuit breaker including near said line terminals a first pair of primary disconnect members and a first secondary disconnect member;

(d) an intermediate member movably mounted inside said enclosure between said stationary line terminals and said circuit breaker disconnect members, said intermediate member comprising:

(i) a movable frame having a bracket extending from one portion thereof towards said circuit breaker, (ii) a second pair of primary disconnect members supported by said frame in cooperative relationship with said first pair and being continually electrically connected to said line terminals, and (iii) another secondary disconnect member supported by said bracket in cooperative relationship with said first secondary disconnect member; and (e) means for moving said intermediate member from a first position wherein both said second pair of primary disconnect members and said other secondary disconnect member interengage said first pair of primary disconnect members and said first secondary disconnect member, respectively, through a second position wherein said pairs of primary disconnect members are separated and only said secondary disconnect members remain interengaged, and to a third position in which said secondary disconnect members too are separated.

4. An electric switchgear apparatus comprising:

(a) an enclosure including a front access panel and a rear wall spaced from said panel;

(b) a circuit breaker positioned within said enclosure behind said front panel;

(c) a first pair of primary disconnect members extending from the rear of said circuit breaker toward said rear wall;

(d) a secondary disconnect member comprising a plurality of conductive elements mounted on said circuit breaker;

(e) stationary line terminals supported adjacent to said rear wall;

(f) an intermediate member movably disposed between said circuit breaker and said line terminals, said intermediate member including:

(i) a second pair of primary disconnect members extending forwardly from said intermediate member toward said circuit breaker, said second pair of primary disconnect members being disposed, respectively, for separable engagement with the first pair of primary disconnect members and for continuous electrical connection to said line terminals, and (ii) another secondary disconnect member protruding forwardly from said intermediate member toward said circuit breaker secondary disconnect member, said other secondary disconnect member comprising a plurality of electrically conductive elements disposed for slidable engagement with the respective elements of the breaker secondary disconnect member; and (g) means for imparting rectilinear movement to said intermediate member so as to move it between three predetermined positions, a first position wherein said first and second pairs of primary disconnects are interengaged so as to include said circuit breaker in a first external circuit, a second position wherein only said secondary disconnect members are slidably interengaged so as to include said circuit breaker in a second external circuit, and a third position wherein said circuit breaker is completely disengaged from any external circuit.

5. In electric switchgear apparatus, an enclosure adapted to receive, in a releasably fixed disposition between opposing sidewalls of the enclosure, a removable circuit breaker having a first pair of disconnect members, the enclosure comprising:

(a) an end wall having stationary line terminals mounted thereon, said line terminals being disposed in spaced relation to the position of the disconnect members of said breaker when received in said fixed disposition;

(b) an intermediate member in the space between said stationary line terminals and said position of the breaker disconnect members, said intermediate member being supported for reciprocating movement relative to said end wall between predetermined positions and having mounted thereon a second pair of disconnect members in continuous electric contact with the respective line terminals, said second pair of disconnect members being adapted separably to engage the first pair of disconnect members when the intermediate member is in a predetermined one of its positions; and (c) means for moving said intermediate member between said predetermined positions, said means including:

(i) a manually operable actuating member disposed for rectilinear movement outside said enclosure, (ii) an angularly movable mechanism coupled to said actuating member for actuation thereby, and (iii) means connecting said mechanism to said intermediate member to convert the angular motion of said mechanism to reciprocating motion of said intermediate member.

6. In an electric switchgear apparatus, an enclosure unit adapted to receive a removable circuit breaker equipped with a first pair of primary disconnect members and a first secondary member, the enclosure unit comprising:

(a) a pair of opposing sidewalls;

(b) an end wall spanning said sidewalls and having stationary line terminals mounted thereon;

(c) means adapted to support the circuit breaker in between said sidewalls in spaced relation to said end wall;

(d) an intermediate member supported for reciprocating movement in the space between said line terminals and the circuit breaker when supported by said means, said intermediate member having a second pair of primary disconnect members and another secondary disconnect member mounted thereon in cooperating relationship with the corresponding disconnect members of the circuit breaker, and said second pair of members being disposed in continuous electric contact with said line terminals throughout the course of reciprocating movement of the intermediate member; and (e) means for moving said intermediate member between three discrete positions, said means including:

(i) a manually operable actuating member, (ii) an angularly movable mechanism coupled to said actuating member for actuation thereby, and (iii) means connecting said mechanism to the intermediate member to convert the angular motion of said mechanism to reciprocating motion of said intermediate member.

7. In electric switchgear apparatus, an enclosure adapted to receive, in a releasably fixed disposition between opposing sidewalls to the enclosure, a removable circuit breaker having a first pair of disconnect members, the enclosure comprising:

(a) an end wall having stationary line terminals mounted thereon, said line terminals being disposed in spaced relation to the positions of the disconnect members of the circuit breaker when received in said fixed disposition;

(b) an intermediate member in the space between said stationary line terminals and said positions of the breaker disconnect members, said intermediate member being supported for reciprocating movement relative to said end wall between predetermined positions and having mounted thereon a second pair of disconnect members in continuous electric contact with the respective line terminals, said second pair of disconnect members being adapted separably to engage the first pair of disconnect members when the intermediate member is in a predetermined one of its positions; and (c) means for moving said intermediate member between said predetermined positions, said means including:
    (i) a manually operable knob,
    (ii) a driving mechanism,
    (iii) a flexible connecting member anchored to said knob and coupled to the driving mechanism for actuating said mechanism in response to movement of the knob,
    (iv) means connecting said mechanism to said intermediate member to impart motion to said intermediate member upon actuation of the mechanism, and
    (v) a stop member attached to said connecting member for limiting the amount of movement of said manually operable knob.

8. The switchgear apparatus defined in claim 7 wherein the driving mechanism comprises: a shaft journaled in the enclosure, means connecting said shaft to said intermediate member for converting rotational motion of said shaft into reciprocating motion of the intermediate member; a ratchet wheel fixedly mounted on said shaft; an oscillatory member rotatably mounted on said shaft adjacent to said ratchet wheel and coupled to the flexible connecting member, means for angularly advancing said oscillatory member in response to movement of the manually operable knob; a pawl pivotally mounted on said oscillatory member and spring biased into driving relationship with said ratchet wheel upon advancement of the oscillatory member; and resilient means for yieldably opposing advancement of said oscillatory member, said resilient means returning said oscillatory member, said connecting member and said knob to initial positions thereof when the knob is released after manual movement thereof.

9. The switchgear apparatus defined in claim 8 wherein the oscillatory member comprises a sprocket wheel and said flexible connecting member comprises a cable anchored at one end to the knob and connected at its other end to a chain which directly engages said sprocket wheel for effecting angular advancement thereof upon movement of said knob.

10. In electric switchgear apparatus, an enclosure adapted to receive, in a releasably fixed disposition between opposing sidewalls of the enclosure, a removable circuit breaker having a first pair of disconnect members, the enclosure comprising:

(a) an end wall having stationary line terminals mounted thereon, said line terminals being disposed in spaced relation to the positions of the disconnect members of the circuit breaker when received in said fixed disposition;

(b) an intermediate member in the space between said stationary line terminals and said positions of the breaker disconnect members, said intermediate member being supported for reciprocating movement relative to said end wall between predetermined positions and having mounted thereon a second pair of disconnect members in continuous electric contact with the respective line terminals, said second pair of disconnect members being adapted separably to engage the first pair of disconnect members when the intermediate member is in a predetermined one of its positions; and (c) means for moving said intermediate member between said predetermined positions, said means including:
    (i) a pivotally mounted manually operable lever,
    (ii) an oscillatory shaft,
    (iii) a driving linkage system interconnecting said shaft and said lever for actuating the shaft upon movement of the lever, and
    (iv) a driven linkage system interconnecting said shaft and said intermediate member for imparting motion to said intermediate member upon actuation of said shaft.

11. In electric switchgear apparatus, an enclosure adapted to receive, in a releasably fixed disposition between opposing sidewalls and behind a front panel of the enclosure, a removable circuit breaker having a first pair of disconnect members extending rearwardly therefrom, the enclosure comprising:

(a) a rear wall having stationary line termnials mounted thereon;

(b) an intermediate member supported immediately in front of said rear wall for horizontal reciprocating movement relative thereto, said intermediate member having mounted thereon a second pair of disconnect members disposed in continuous electric contact with the respective line terminals and adapted, when the intermediate member is in a predetermined forward position, separably to engage the disconnect members of the breaker when received in said fixed disposition; and (c) means for moving said intermediate member to and from its forward position, said means including:
    (i) a manually operable lever having a forward end accessible from in front of the enclosure, said lever within the enclosure being pivotally supported on a rearward portion thereof for movement about a vertical axis located near said rear wall,
    (ii) a vertically oriented oscillatory shaft journaled in the enclosure,
    (iii) a driving linkage system interconnecting the rear end of said lever and the shaft for producing angular movement of the shaft in response to movement of the foreward end of said lever, and
    (iv) a driven linkage system interconnecting said shaft and said intermediate member for imparting motion to the intermediate member in response to angular movement of the shaft.

12. In electric switchgear apparatus, an enclosure adapted to receive, in a releasably fixed disposition between opposing sidewalls and behind a front panel of the enclosure, a removable circuit breaker having a first pair of disconnect members extending rearwardly therefrom, the enclosure comprising:

(a) a rear wall having stationary line terminals mounted thereon;

(b) an intermediate member supported immediately in front of said rear wall for horizontal reciprocating movement relative thereto, said intermediate member having mounted thereon a second pair of disconnect members disposed in continuous electric contact with the respective line terminals and adapted, when the intermediate member is in a predetermined forward position, separably to engage the disconnect members of said breaker when received in said fixed disposition; and (c) means for moving said intermediate member to and from its forward position, said means including:
(i) a manually operable actuating member disposed for movement in front of the front panel of the enclosure,
(ii) an angularly movable mechanism coupled to said actuating member for actuation thereby, and
(iii) means connecting said mechanism to said intermediate member to convert the angular motion of said mechanism to horizontal reciprocating motion of said intermediate member.

References Cited by the Examiner

UNITED STATES PATENTS

| | | | |
|---|---|---|---|
| 806,140 | 12/05 | Helm | 74—105 |
| 1,620,795 | 3/27 | Black | 74—105 |

FOREIGN PATENTS

| | | |
|---|---|---|
| 334,943 | 9/30 | Great Britain. |
| 538,219 | 7/41 | Great Britain. |

BERNARD A. GILHEANY, *Primary Examiner.*